US012675298B2

(12) United States Patent
Tian et al.

(10) Patent No.: US 12,675,298 B2
(45) Date of Patent: Jul. 7, 2026

(54) METHOD AND APPARATUS FOR DISPLAYING BOOT MODE OF PCIE DEVICE, DEVICE, AND MEDIUM

(71) Applicant: SUZHOU METABRAIN INTELLIGENT TECHNOLOGY CO., LTD., Suzhou (CN)

(72) Inventors: Muqing Tian, Suzhou (CN); Juan Zhao, Suzhou (CN); Xiuqiang Sun, Suzhou (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 19/142,147

(22) PCT Filed: Sep. 30, 2024

(86) PCT No.: PCT/CN2024/122602
§ 371 (c)(1),
(2) Date: Jun. 20, 2025

(87) PCT Pub. No.: WO2025/112897
PCT Pub. Date: Jun. 5, 2025

(65) Prior Publication Data
US 2026/0119188 A1    Apr. 30, 2026

(30) Foreign Application Priority Data
Nov. 29, 2023    (CN) ......................... 202311608727.3

(51) Int. Cl.
*G06F 9/44* (2018.01)
*G06F 9/4401* (2018.01)

(52) U.S. Cl.
CPC .................................. *G06F 9/4401* (2013.01)

(58) Field of Classification Search
None
See application file for complete search history.

(56) References Cited

U.S. PATENT DOCUMENTS

| | | | |
|---|---|---|---|
| 10,394,570 B2 * | 8/2019 | Baik ...................... | G06F 9/4406 |
| 2005/0066108 A1 * | 3/2005 | Zimmer .............. | G06F 12/0223 |
| | | | 711/E12.005 |

(Continued)

FOREIGN PATENT DOCUMENTS

| | | |
|---|---|---|
| CN | 115470062 A | 12/2022 |
| CN | 115658158 A | 1/2023 |

(Continued)

OTHER PUBLICATIONS

The search report of CN application No. 202311608727.3 issued on Jan. 3, 2024.

(Continued)

*Primary Examiner* — Danny Chan
(74) *Attorney, Agent, or Firm* — Scully, Scott, Murphy & Presser, P.C.

(57) ABSTRACT

The present disclosure provides a method and apparatus for displaying a boot mode of a PCIE device, a device, and a medium, and relates to the technical field of servers. The method includes: querying in all root bridge devices in a BIOS initialization device stage after a server is powered on; determining, based on each root bridge device of the root bridge devices, a PCIE device under the root bridge device; reading a first preset bit of a capability list and a second preset bit in PCIE capable bits in a configuration space of the PCIE device when the PCIE device is present; and displaying, based on the first preset bit of the capability list and the second preset bit in the PCIE capable bits, a boot mode (Continued)

Query in all root bridge devices in a BIOS initialization device stage after a server is powered on — 101

Determine, based on each root bridge device of the root bridge devices, a PCIE device under the root bridge device — 102

For each PCIE device, in a case when the PCIE device is present, read a fourth bit of a capability list and a seventh bit in PCIE capable bits in a configuration space of the PCIE device — 103

Display, based on the fourth bit of the capability list and the seventh bit in the PCIE capable bits, a boot mode supported by the PCIE device under a BIOS device option — 104 supported by the PCIE device under a BIOS device option, which may display the boot mode supported by the PCIE device being present.

20 Claims, 2 Drawing Sheets

(56) References Cited

U.S. PATENT DOCUMENTS

| | | | |
|---|---|---|---|
| 2010/0082890 A1* | 4/2010 | Heo | G06F 12/0246 |
| | | | 711/E12.001 |
| 2011/0185163 A1* | 7/2011 | Hidaka | G06F 13/4081 |
| | | | 710/305 |
| 2013/0332634 A1* | 12/2013 | Glaser | G06F 13/4286 |
| | | | 710/104 |
| 2015/0254082 A1* | 9/2015 | Vishwanathan | G06F 9/4416 |
| | | | 713/2 |
| 2017/0242686 A1* | 8/2017 | Vidyadhara | G06F 8/656 |
| 2019/0095221 A1* | 3/2019 | Zhan | G06F 9/4408 |
| 2019/0339986 A1* | 11/2019 | Khatri | G06F 13/24 |
| 2020/0192852 A1* | 6/2020 | Caruk | G06F 13/4282 |
| 2021/0216388 A1* | 7/2021 | Kumar | G06F 11/079 |
| 2021/0286692 A1 | 9/2021 | Chien | |
| 2022/0269565 A1* | 8/2022 | Chou | G06F 11/1417 |
| 2024/0045748 A1* | 2/2024 | Ma | G06F 11/0727 |

FOREIGN PATENT DOCUMENTS

| | | |
|---|---|---|
| CN | 115658582 A | 1/2023 |
| CN | 115794690 A | 3/2023 |
| CN | 116775540 A | 9/2023 |
| CN | 117311832 A | 12/2023 |
| WO | 2021139355 A1 | 7/2021 |

OTHER PUBLICATIONS

The search report of PCT application No. PCT/CN2024/122602 issued on Dec. 23, 2024.

* cited by examiner

METHOD AND APPARATUS FOR DISPLAYING BOOT MODE OF PCIE DEVICE, DEVICE, AND MEDIUM

CROSS-REFERENCE TO RELATED APPLICATION

This application claims priority to Chinese Patent Application No. 202311608727.3, filed to the China National Intellectual Property Administration on Nov. 29, 2023 and entitled "Method and Apparatus for Displaying Boot Mode of PCIE Device, Device, and Medium", which is incorporated herein by reference in its entirety.

TECHNICAL FIELD

The present disclosure relates to the technical field of servers, and in particular, to a method and apparatus for displaying a boot mode of a Peripheral Component Interconnect Express (PCIE) device, a device, and a medium.

BACKGROUND

With the rapid development of server technology, the ease of use, performance and functions of servers are constantly enhanced. In particular, the efficient ease of use may enable operation and maintenance personnel of a server to manage effortlessly and work efficiently.

However, in some application scenarios, a server is connected to a plurality of PCIE devices, and the plurality of PCIE devices may support different boot modes. If an inappropriate boot mode is selected, it may lead to the problems such as the PCIE devices being not identified, disk dropping, card dropping, and system loss.

However, since the boot mode supported by the PCIE device being present is not displayed under a Basic Input Output System (BIOS) device option and a device list of a Baseboard Management Controller (BMC) network interface, the operation and maintenance personnel of the server can only confirm the boot mode supported by the PCIE device one by one by looking up a user manual and a device instruction manual of each PCIE device, which brings great trouble to the operation and maintenance personnel of the server.

SUMMARY

In an aspect, the present disclosure provides a method for displaying a boot mode of a PCIE device, applied to a BIOS integrated circuit, and the method includes:

querying in all root bridge devices in a BIOS initialization device stage after a server is powered on;

determining, based on each root bridge device of the root bridge devices, a PCIE device under the root bridge device;

for the PCIE device, in response to determining that the PCIE device is present, reading a first preset bit of a capability list and a second preset bit in PCIE capable bits in a configuration space of the PCIE device; and displaying, based on the first preset bit of the capability list and the second preset bit in the PCIE capable bits, a boot mode supported by the PCIE device under a BIOS device option.

In some embodiments, the displaying, based on the first preset bit of the capability list and the second preset bit in the PCIE capable bits, the boot mode supported by the PCIE device under a BIOS device option, includes:

generating a file in a preset format based on device information of the PCIE device, the device information including the preset global variable;

creating, under the BIOS device option, a topology of the PCIE device based on the device information of the PCIE device in the file in the preset format;

creating, under the topology of the PCIE device, a BIOS option of the boot mode supported by the PCIE device;

determining, based on a value of the preset global variable under the BIOS option of the boot mode supported by the PCIE device, the boot mode supported by the PCIE device; and displaying, under the BIOS option of the boot mode supported by the PCIE device, the boot mode supported by the PCIE device.

In some embodiments, the device information includes the preset global variable, and before a step of the generating a file in a preset format based on device information of the PCIE device, the method further includes:

performing an AND operation on the first preset bit of the capability list and the second preset bit in the PCIE capable bits to obtain an AND operation result; and assigning the AND operation result to the preset global variable.

In some embodiments, the determining, based on a value of the preset global variable under the BIOS option of the boot mode supported by the PCIE device, the boot mode supported by the PCIE device, includes:

in response to determining that the value of the preset global variable under the BIOS option of the boot mode supported by the PCIE device is 1, determining that the boot mode supported by the PCIE device is a Unified Extensible Firmware Interface (UEFI) mode and a Legacy mode; or in response to determining that the value of the preset global variable under the BIOS option of the boot mode supported by the PCIE device is 0, determining that the boot mode supported by the PCIE device is a Legacy mode.

In some embodiments, after a step of the displaying, based on the first preset bit of the capability list and the second preset bit in the PCIE capable bits, the boot mode supported by the PCIE device under the BIOS device option further includes:

in response to determining that the boot mode of the PCIE device is adjusted to a target boot mode, verifying whether the target boot mode is consistent with the boot mode supported by the PCIE device; and in response to determining that the target boot mode is consistent with the boot mode supported by the PCIE device, storing the target boot mode into a dynamic region of a non-volatile random access memory, so that the PCIE device boots by using the target boot mode at a next boot.

In some embodiments, after a step of the verifying whether the target boot mode is consistent with the boot mode supported by the PCIE device, the method further includes:

in response to determining that the target boot mode is inconsistent with the boot mode supported by the PCIE device, determining that the PCIE device is a target PCIE device; and displaying prompt information that the target PCIE device does not support the target boot mode through a pop-up window.

In some embodiments, the reading a first preset bit of a capability list and a second preset bit in PCIE capable bits in a configuration space of the PCIE device includes:

reading the first preset bit of the capability list and the second preset bit in the PCIE capable bits through a capability list pointer of the PCIE device.

In some embodiments, the method further includes:

acquiring information of a downstream port through a PCIE protocol;

generating, based on the information of the downstream port, a linked list of slot information for the PCIE device; and generating, based on the linked list of slot information for the PCIE device and the boot mode supported by the PCIE device, a target data structure table, so that a user exports the target data structure table and views the boot mode supported by the PCIE device based on the target data structure table.

In some embodiments, the method further includes:

sending the file in the preset format to a Baseboard Management Controller (BMC) integrated circuit through a redfish out-of-band interface, so that the BMC integrated circuit displays, based on the file in the preset format, the boot mode supported by the PCIE device under a device list of a BMC network interface.

In some embodiments, the first preset bit is a fourth bit and the second preset bit is a seventh bit.

In some embodiments, a value of the first preset bit of the capability list is configured to indicate whether the PCIE device supports a UEFI mode, and a value of the second preset bit in the PCIE capable bits is configured to indicate whether the PCIE device supports the UEFI mode.

In some embodiments, the determining, based on each root bridge device of the root bridge devices, a PCIE device under the root bridge device includes:

storing the root bridge device into a linked list; and traversing the root bridge device in the linked list to find the PCIE device under the root bridge device.

In an aspect, the present disclosure further provides a method for displaying a boot mode of a PCIE device, applied to a BMC integrated circuit, and the method includes:

receiving a file in a preset format sent by a BIOS integrated circuit, the file in the preset format being generated based on device information of the PCIE device, the device information of the PCIE device including a preset global variable, and the preset global variable storing an AND operation result of a first preset bit of a capability list and a second preset bit in PCIE capable bits in a configuration space of the PCIE device; and displaying, based on the file in the preset format, a boot mode supported by the PCIE device under a device list of a BMC network interface.

In some embodiments, the displaying, based on the file in the preset format, a boot mode supported by the PCIE device under a device list of a BMC network interface, includes:

parsing the file in the preset format to obtain the device information of the PCIE device;

extracting, for the PCIE device, the AND operation result in the preset global variable from the device information of the PCIE device;

determining, based on the AND operation result, the boot mode supported by the PCIE device; and displaying the boot mode supported by the PCIE device under the device list of the BMC network interface.

In an aspect, the present disclosure further provides an apparatus for displaying a boot mode of a PCIE device, including:

a query module, configured to query in all root bridge devices in a BIOS initialization device stage after a server is powered on;

a determination module, configured to determine, based on each root bridge device of the root bridge devices, a PCIE device under the root bridge device;

a reading module, configured to, in response to determining that the PCIE device is present, for the PCIE devices, read a first preset bit of a capability list and a second preset bit in PCIE capable bits in a configuration space of the PCIE device; and a first display module, configured to display, based on the first preset bit of the capability list and the second preset bit in the PCIE capable bits, a boot mode supported by the PCIE device under a BIOS device option.

In some embodiments, the first preset bit is a fourth bit and the second preset bit is a seventh bit.

In some embodiments, a value of the first preset bit of the capability list is configured to indicate whether the PCIE device supports a UEFI mode, and a value of the second preset bit in the PCIE capable bits is configured to indicate whether the PCIE device supports the UEFI mode.

In an aspect, the present disclosure further provides an apparatus for displaying a boot mode of a PCIE device, including:

a receiving module, configured to receive a file in a preset format sent by a BIOS integrated circuit, the file in the preset format being generated based on device information of the PCIE device, the device information of the PCIE device including a preset global variable, and the preset global variable storing an AND operation result of a first preset bit of a capability list and a second preset bit in PCIE capable bits in a configuration space of the PCIE device; and a second display module, configured to display, based on the file in the preset format, the boot mode supported by the PCIE device under a device list of a BMC network interface.

In an aspect, the present disclosure further provides a BIOS integrated circuit, including:

one or more processors; and a memory associated with the one or more processors, the memory being configured to store computer-readable instructions that, when read and executed by the one or more processors, implement steps of the method for displaying a boot mode of a PCIE device according to the above aspect.

In an aspect, the present disclosure further provides a BMC integrated circuit, including:

one or more processors; and a memory associated with the one or more processors, the memory is configured to store computer-readable instructions that, when read and executed by the one or more processors, implement steps of the method for displaying the boot mode of the PCIE device according to the above aspect.

In an aspect, the present disclosure further provides a computer program product, including computer program/computer-readable instructions that, when executed by a processor, implement steps of the method for displaying the boot mode of the PCIE device according to any one of the above aspects.

In an aspect, the present disclosure further provides a non-transitory computer-readable storage medium, on which computer-readable instructions are stored, the computer-readable instructions, when executed by one or more processors, implement steps of the method for displaying the boot mode of the PCIE device according to any one of the above aspect s.

According to the method and apparatus for displaying the boot mode of the PCIE device, the device, and the medium provided by the present disclosure, first, the root bridge device is queried in the BIOS initialization device stage after the server is powered on; then, based on each of the root bridge devices, the PCIE device under the root bridge device is determined, and all the PCIE devices may be found; then, for each of the PCIE devices, in response to determining that the PCIE device is present, the first preset bit of the capability list and the second preset bit in the PCIE capable bits in the configuration space of the PCIE device are read; and finally, the first preset bit of the capability list is configured to indicate whether the PCIE device supports the UEFI mode, the second preset bit in the PCIE capable bits is configured to indicate whether the PCIE device supports the UEFI mode, the boot mode supported by the PCIE device may be determined based on the first preset bit of the capability list and the second preset bit in the PCIE capable bits, the boot mode supported by the PCIE device is displayed under the BIOS device option, and the boot mode supported by the PCIE device being present may be displayed under the BIOS device option.

BRIEF DESCRIPTION OF THE DRAWINGS

In order to more clearly describe technical solutions in the present disclosure or the related art, accompany drawings required to describe the embodiments or the related art will be briefly described hereinafter. Apparently, the accompany drawings in the following description are merely some but not all embodiments of the present disclosure, and for those of ordinary skill in the art, other accompany drawings may be obtained based on these accompany drawings without any creative efforts.

DETAILED DESCRIPTION OF THE EMBODIMENTS

In order to make the purposes, technical solutions and advantages of the present disclosure clearer, the technical solutions in the present disclosure will be clearly and completely described in conjunction with the accompanying drawings in the present disclosure. It is apparent that the described embodiments are merely some but not all of the embodiments of the present disclosure. All other embodiments obtained by those of ordinary skill in the art on the basis of the embodiments of the present disclosure without creative efforts shall fall within the scope of protection of the present disclosure.

Terms "first", "second" and the like in the specification of the present disclosure are used for distinguishing similar objects, rather than describing a specific sequence or a precedence order. It should be understood that the data used in such a way may be exchanged where appropriate, so that the embodiments of the present disclosure may be implemented in an order other than those illustrated or described herein, and objects distinguished by the terms "first", "second" and the like are generally of the same type, and the number of objects is not limited. For example, the first object may be one or more. In addition, "and/or" in the description represents at least one of the connected objects, and the character "/" generally indicates that the contextual objects are in an "or" relationship.

A method for displaying a boot mode of a PCIE device provided in the embodiments of the present disclosure will be described in detail below through the embodiments and application scenarios thereof in conjunction with the accompanying drawings.

Figures 1, 2, 3:
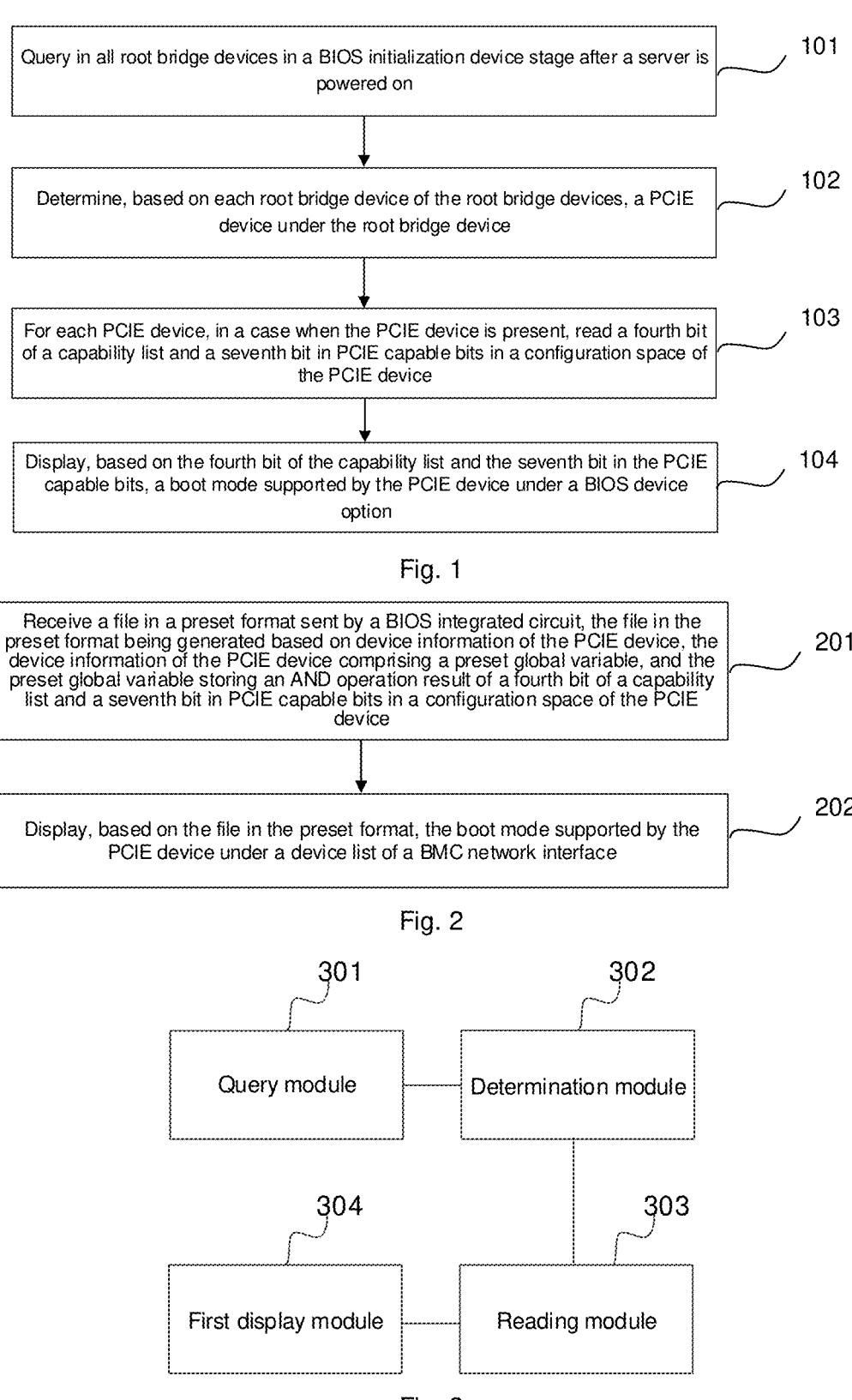
FIG. 1 is a first schematic flowchart of a method for displaying a boot mode of a PCIE device according to an embodiment of the present disclosure.
FIG. 2 is a second schematic flowchart of a method for displaying a boot mode of a PCIE device according to an embodiment of the present disclosure.
FIG. 3 is a first schematic structural diagram of an apparatus for displaying a boot mode of a PCIE device according to an embodiment of the present disclosure.

Referring to FIG. 1, FIG. 1 is a first schematic flowchart of a method for displaying a boot mode of a PCIE device according to an embodiment of the present disclosure. The method is applied to a BIOS integrated circuit. As shown in FIG. 1, the method may include the following steps:

at S101, query in all root bridge devices in a BIOS initialization device stage after a server is powered on;

at S102, determine, based on each of the root bridge devices, a PCIE device under the root bridge device;

at S103, for the PCIE device, in response to determining that the PCIE device is present, read a first preset bit of a capability list and a second preset bit in PCIE capable bits in a configuration space of the PCIE device; and at S104, display, based on the first preset bit of the capability list and the second preset bit in the PCIE capable bits, a boot mode supported by the PCIE device under a BIOS device option.

In S101 and S102, the root bridge device is an interface between a central processing unit (CPU) and a PCIE topology, and the PCIE device in the PCIE topology may be found through the root bridge device.

All the root bridge devices are queried in the BIOS initialization device stage after the server is powered on, then the queried root bridge devices are stored into a linked list, and the root bridge devices in the linked list are traversed, so that the PCIE device under each of the root bridge devices may be found.

In S103, all the present PCIE devices are traversed, and the configuration space of the PCI device is accessed through EFI_PCI_IO_PROTOCOL. The configuration space of the PCI device includes a capability list and a PCIE capable bit.

In some embodiments, the first preset bit of the capability list and the second preset bit in the PCIE capable bits are read through a capability list pointer (CapailityPtr) of the PCIE device. A value of the first preset bit of the capability list indicates whether the device supports a Unified Extensible Firmware Interface (UEFI) mode, for example, if the value of the first preset bit is 1, it indicates that the device supports the UEFI mode, which means that the device supports the UEFI mode and a Legacy mode, and if the value of the bit is not 1, it indicates that the device only supports the Legacy mode. The second preset bit in the PCIE capable bits indicates whether the device supports the UEFI mode, for example, if the second preset bit is 1, it indicates that the device supports the UEFI mode, which means that the device supports the UEFI mode and the Legacy mode, and if the value of the bit is not 1, it indicates that the device only supports the Legacy mode.

Therefore, in S104, the boot mode supported by the PCIE device may be determined based on the first preset bit of the capability list and the second preset bit in the PCIE capable bits, and then the boot mode supported by the PCIE device is displayed under the BIOS device option.

In some embodiments, the first preset bit is a fourth bit and the second preset bit is a seventh bit. The fourth bit of the capability list indicates whether the device supports the UEFI mode. If the bit is 1, it indicates that the device supports the UEFI mode, which means that the device supports the UEFI mode and the Legacy mode, otherwise the device only supports the Legacy mode. The seventh bit in the PCIE capable bits indicates whether the device supports the UEFI mode. If the bit is 1, it indicates that the device supports the UEFI mode, which means that the device supports the UEFI mode and the Legacy mode, otherwise the device only supports the Legacy mode.

According to the method for displaying the boot mode of the PCIE device provided by the embodiments of the present disclosure, first, the BIOS integrated circuit queries all the root bridge devices in the BIOS initialization device stage after the server is powered on; then, based on each of the root bridge devices, the PCIE device under the root bridge device is determined, and all the PCIE devices may be found; then, for each of the PCIE devices, in response to determining that the PCIE device is present, the first preset bit of the capability list and the second preset bit in the PCIE capable bits in the configuration space of the PCIE device are read; finally, the first preset bit of the capability list indicates whether the device supports the UEFI mode, the second preset bit in the PCIE capable bits indicates whether the device supports the UEFI mode, the boot mode supported by the PCIE device may be determined based on the first preset bit of the capability list and the second preset bit in the PCIE capable bits, the boot mode supported by the PCIE device is displayed under the BIOS device option, and the boot mode supported by the present PCIE device may be displayed under the BIOS device option, so that operation and maintenance personnel of the server may simply, quickly, and intuitively determine the boot mode supported by the present PCIE device, thereby deciding the most appropriate boot mode, and avoiding the problems such as the PCIE devices being not identified, disk dropping, card dropping, and system loss caused by selecting an inappropriate boot mode.

In one exemplary embodiment, S104 may include the following sub-steps.

At S1041, perform an AND operation on the first preset bit of the capability list and the second preset bit in the PCIE capable bits, to obtain an AND operation result.

For example, the first preset bit of the capability list is set to 1, and the second preset bit in the PCIE capable bits is also set to 1, then 1&1=1, that is, the AND operation result is 1.

The first preset bit of the capability list is set to 0, and the second preset bit in the PCIE capable bits is also set to 0, then 0&0=0, that is, the AND operation result is 0.

At S1042, assign the AND operation result to a preset global variable.

For example, the preset global variable may be DeviceSupportBootModeValue. The global variable DeviceSupportBootModeValue is declared, and the AND operation result is assigned to the global variable DeviceSupportBootModeValue.

At S1043, a file in a preset format is generated based on device information of each of the PCIE devices, the device information includes the preset global variable.

For example, the file in the preset format may be a cJSON file, and the device information containing the global variable DeviceSupportBootModeValue of each of the PCIE devices is created into a cJSON file. cJSON is a JavaScript Object Notation (Json) library based on C language.

At S1044, create a topology of each of the PCIE devices based on the device information of each of the PCIE devices in the file in the preset format, under the BIOS device option.

For example, in response to determining that the BIOS boots under the BIOS device option, the topology of each of the PCIE devices is automatically created according to the device information of each of the PCIE devices in the cJSON file.

At S1045, create a BIOS option of a boot mode supported by each of the PCIE devices under the topology of each of the PCIE devices.

For example, the BIOS option of boot mode supported by the device is automatically created under each of the PCIE devices.

At S1046, determine the boot mode supported by the PCIE device, based on a value of the preset global variable under the BIOS option of the boot mode supported by each of the PCIE devices.

In some embodiments, in response to determining that the value of the preset global variable under the BIOS option of the boot mode supported by the PCIE device is 1, it is determined that the boot mode supported by the PCIE device is the UEFI mode and the Legacy mode; and in response to determining that the value of the preset global variable under the BIOS option of the boot mode supported by the PCIE device is 0, it is determined that the boot mode supported by the PCIE device is the Legacy mode.

For example, if the global variable DeviceSupportBootModeValue==1 under the BIOS option of the boot mode supported by the PCIE device, it indicates that the device supports the UEFI mode, which means that the boot mode supported by the PCIE device is the UEFI mode and the Legacy mode. If the global variable DeviceSupportBootModeValue==0 under the BIOS option of the boot mode supported by the PCIE device, it indicates that the device does not support the UEFI mode, which means that the boot mode supported by the PCIE device is the Legacy mode.

At S1047, display the boot mode supported by the PCIE device under the BIOS option of the boot mode supported by each of the PCIE devices.

For example, in response to determining that the boot mode supported by the PCIE device is the UEFI mode and the Legacy mode, under the BIOS option of the boot mode supported by the PCIE device, the boot mode supported by the PCIE device is displayed as the UEFI mode and the Legacy mode. If the boot mode supported by the PCIE device is the Legacy mode, under the BIOS option of the boot mode supported by the PCIE device, the boot mode supported by the PCIE device is displayed as the Legacy mode.

In this embodiment, first, the AND operation result of the first preset bit of the capability list and the second preset bit in the PCIE capable bits is assigned to the preset global variable; then, the file in the preset format is generated based on the device information of each of the PCIE devices including the preset global variable; then, under the BIOS device option, the topology of each of the PCIE devices is created based on the device information of each of the PCIE devices in the file in the preset format; the BIOS option of the boot mode supported by each of the PCIE devices is created under the topology of each of the PCIE devices; and finally, the boot mode supported by the PCIE device is determined based on the value of the preset global variable under the BIOS option of the boot mode supported by each of the PCIE devices, so as to display the boot mode supported by the PCIE device under the BIOS option of the boot mode supported by each of the PCIE devices.

In one exemplary embodiment, the method further includes: in response to determining that the boot mode of the PCIE device is adjusted to a target boot mode, verifying whether the target boot mode is consistent with the boot mode supported by the PCIE device; and in response to determining that the target boot mode is consistent with the boot mode supported by the PCIE device, storing the target boot mode into a dynamic region of a non-volatile random access memory (RAM), so that the PCIE device boots by using the target boot mode at the next boot.

For example, in response to determining that the boot mode of the PCIE device is adjusted to the UEFI mode, whether the UEFI mode is consistent with the boot mode supported by the PCIE device is verified. If the boot mode supported by the PCIE device is the UEFI mode and the Legacy mode, the adjusted boot mode of the PCIE device is consistent with the boot mode supported by the PCIE device, and the UEFI mode is stored into the dynamic region of the non-volatile RAM. The PCIE device boots by using the UEFI mode at the next boot.

In this embodiment, in response to determining that the adjusted boot mode of the PCIE device is consistent with the boot mode supported by the PCIE device, the PCIE device boots by using the adjusted boot mode of the PCIE device at the next boot, so as to avoid the problems such as the PCIE devices being not identified, disk dropping, card dropping, and system loss due to an inappropriate adjusted boot mode.

In one exemplary embodiment, the method further includes: in response to determining that the target boot mode is inconsistent with the boot mode supported by the PCIE device, determining that the PCIE device is a target PCIE device; and displaying prompt information that the target PCIE device does not support the target boot mode through a pop-up window.

For example, in response to determining that the boot mode of the PCIE device is adjusted to the UEFI mode, whether the UEFI mode is consistent with the boot mode supported by the PCIE device is verified. If the boot mode supported by the PCIE device is the Legacy mode, the adjusted boot mode of the PCIE device is inconsistent with the boot mode supported by the PCIE device, it is determined that the PCIE device is the target PCIE device, and the prompt information that the target PCIE device does not support the UEFI mode is displayed through the pop-up window.

In this embodiment, in response to determining that the adjusted boot mode of the PCIE device is inconsistent with the boot mode supported by the PCIE device, the operation and maintenance personnel of the server is timely prompted that the system does not support the adjusted boot mode of the PCIE device.

In one exemplary embodiment, the method further includes: acquiring information of all downstream ports through a PCIE protocol; generating a linked list of slot information for each of the PCIE devices based on the information of all the downstream ports; and generating a target data structure table based on the linked list of slot information for each of the PCIE devices and the boot mode supported by each of the PCIE devices, so that the user exports the target data structure table and views the boot mode supported by each of the PCIE devices based on the target data structure table.

In some embodiments, the target data structure table may be a System Management BIOS (SMBIOS) Type 9 data structure table. The SMBIOS is a unified specification that motherboard or system manufacturers need to follow to display product management information in a standard format.

The information of all the downstream ports is acquired through the PCIE protocol; the linked list of slot information for each of the PCIE devices is generated based on the information of all the downstream ports; and the SMBIOS Type 9 data structure table is expanded to additionally add the boot mode supported by each of the PCIE devices. The operation and maintenance personnel of the server may export the SMBIOS Type 9 data structure table, and view the boot mode supported by each of the PCIE devices.

In this embodiment, the target data structure table may be expanded, and the boot mode supported by each of the PCIE devices may be additionally added, so that the operation and maintenance personnel of the server may export the target data structure table, and view the boot mode supported by each of the PCIE devices. Therefore, the boot mode supported by each of the PCIE devices may be viewed in an in-band manner.

In one exemplary embodiment, the method further includes: sending the file in the preset format to a BMC integrated circuit through a redfish out-of-band interface, so that the BMC integrated circuit displays, based on the file in the preset format, the boot mode supported by each of the PCIE devices under a device list of a BMC network interface.

In some embodiments, the redfish out-of-band interface is reserved and the cJSON file is sent to the BMC integrated circuit through the redfish out-of-band interface. The BMC integrated circuit queries corresponding fields from the cJSON file, determines the boot mode supported by each of the PCIE devices, and then displays the boot mode supported by each of the PCIE devices under the device list of the BMC network interface.

Referring to FIG. 2, FIG. 2 is a second schematic flowchart of a method for displaying a boot mode of a PCIE device according to an embodiment of the present disclosure. The method is applied to a BMC integrated circuit. As shown in FIG. 2, the method may include the following steps:

at S201, receive a file in a preset format sent by a BIOS integrated circuit, the file in the preset format is generated based on device information of each of the PCIE devices, the device information of each of the PCIE devices includes a preset global variable, which stores an AND operation result of a first preset bit of a capability list and a second preset bit in PCIE capable bits in a configuration space of the PCIE device;

at S202, display, based on the file in the preset format, the boot mode supported by each of the PCIE devices under a device list of a BMC network interface.

In S201, for example, the preset global variable may be DeviceSupportBootModeValue. The global variable DeviceSupportBootModeValue is declared, and the BIOS integrated circuit assigns the AND operation result of the first preset bit of the capability list and the second preset bit in the PCIE capable bits in the configuration space of the PCIE device to the global variable DeviceSupportBootModeValue. The file in the preset format may be a cJSON file, and the device information of each of the PCIE devices containing the global variable DeviceSupportBootModeValue is created into a cJSON file. The BIOS integrated circuit sends the cJSON file to the BMC integrated circuit, and the BMC integrated circuit receives the cJSON file sent by the BIOS integrated circuit.

In S202, the BMC integrated circuit displays, based on the cJSON file, the boot mode supported by each of the PCIE devices under a device list of a BMC network interface.

In some embodiments, S202 may include: parsing the file in the preset format to obtain the device information of each of the PCIE devices; extracting, for each of the PCIE devices, the AND operation result of the preset global variable from the device information of the PCIE device; determining the boot mode supported by the PCIE device based on the AND operation result; and displaying the boot mode supported by each of the PCIE devices under the device list of the BMC network interface.

In some embodiments, the BMC integrated circuit parses the cJSON file to obtain the device information of each of the PCIE devices, and extracts the AND operation result of the global variable DeviceSupportBootModeValue from the device information of the PCIE device. In response to determining that the AND operation result is 1, it is determined that the boot mode supported by the PCIE device is the UEFI mode and the Legacy mode. In response to determining that the AND operation result is 0, it is determined that the boot mode supported by the PCIE device is the Legacy mode. The boot mode supported by each of the PCIE devices is displayed under the device list of the BMC network interface.

In this embodiment, the BMC integrated circuit receives the file in the preset format sent by the BIOS integrated circuit, and displays, based on the cJSON file, the boot mode supported by each of the PCIE devices under the device list of the BMC network interface, so that the operation and maintenance personnel of the server may simply, quickly, and intuitively determine the boot mode supported by the present PCIE device, thereby deciding the most appropriate boot mode, and avoiding the problems such as the PCIE devices being not identified, disk dropping, card dropping, and system loss caused by selecting an inappropriate boot mode.

It is to be noted that the execution subject of the method for displaying the boot mode of the PCIE device provided in the embodiments of the present disclosure may be an apparatus for displaying the boot mode of the PCIE device, or a control module in the apparatus for displaying the boot mode of the PCIE device for executing the method for displaying the boot mode of the PCIE device. In the embodiments of the present disclosure, an example in which the apparatus for displaying the boot mode of the PCIE device executes the method for displaying the boot mode of the PCIE device is taken, so as to describe the apparatus for displaying the boot mode of the PCIE device provided in the embodiments of the present disclosure.

It is to be noted that, in the embodiments of the present disclosure, the method for displaying the boot mode of the PCIE device shown in each accompanying drawing is described exemplarily in conjunction with one accompanying drawing in the embodiments of the present disclosure. When implemented, the method for displaying the boot mode of the PCIE device shown in each accompanying drawing may also be implemented in conjunction with any other schematic accompanying drawings that may be combined in the above embodiments, which will not be described herein.

The apparatus for displaying the boot mode of the PCIE device provided in the present disclosure will be described below, and the method for displaying the boot mode of the PCIE device described below may be cross-referenced with the method for displaying the boot mode of the PCIE device described above.

Referring to FIG. 3, FIG. 3 is a first schematic structural diagram of an apparatus for displaying a boot mode of a PCIE device according to an embodiment of the present disclosure. As shown in FIG. 3, the apparatus may include a query module 301, a determination module 302, a reading module 303, and a first display module 304.

The query module 301 is configured to query in all root bridge devices in a BIOS initialization device stage after a server is powered on.

The determination module 302 is configured to determine, based on each of the root bridge devices, a PCIE device under the root bridge device.

The reading module 303 is configured to, for each of the PCIE devices, in response to determining that the PCIE device is present, read a first preset bit of a capability list and a second preset bit in PCIE capable bits in a configuration space of the PCIE device.

The first display module 304 is configured to display, based on the first preset bit of the capability list and the second preset bit in the PCIE capable bits, the boot mode supported by the PCIE device under a BIOS device option.

In some embodiments, the first display module 304 includes an AND operation unit, an assignment unit, a generation unit, a first creation unit, a second creation unit, a mode determination unit, and a display unit.

The AND operation unit is configured to perform an AND operation on the first preset bit of the capability list and the second preset bit in the PCIE capable bits to obtain an AND operation result.

The assignment unit is configured to assign the AND operation result to a preset global variable.

The generation unit is configured to generate a file in a preset format based on device information of each of the PCIE devices, the device information includes the preset global variable.

The first creation unit is configured to create, under the BIOS device option, a topology of each of the PCIE devices based on the device information of each of the PCIE devices in the file in the preset format.

The second creation unit is configured to create a BIOS option of a boot mode supported by each of the PCIE devices under the topology of each of the PCIE devices.

The mode determination unit is configured to determine the boot mode supported by the PCIE device based on a value of the preset global variable under the BIOS option of the boot mode supported by each of the PCIE devices.

The display unit is configured to display the boot mode supported by the PCIE device under the BIOS option of the boot mode supported by each of the PCIE devices.

In some embodiments, the mode determination unit is configured to:

in response to determining that the value of the preset global variable under the BIOS option of the boot mode supported by the PCIE device is 1, determine that the boot mode supported by the PCIE device is a UEFI mode and a Legacy mode; and in response to determining that the value of the preset global variable under the BIOS option of the boot mode supported by the PCIE device is 0, determine that the boot mode supported by the PCIE device is the Legacy mode.

In some embodiments, the apparatus further includes a verification module and a storage module.

The verification module is configured to, in response to determining that the boot mode of the PCIE device is adjusted to a target boot mode, verify whether the target boot mode is consistent with the boot mode supported by the PCIE device.

The storage module is configured to, in response to determining that the target boot mode is consistent with the boot mode supported by the PCIE device, store the target boot mode into a dynamic region of a non-volatile RAM, so that the PCIE device boots by using the target boot mode at the next boot.

In some embodiments, the apparatus further includes a device determination module and a pop-up prompt module.

The device determination module is configured to, in response to determining that the target boot mode is inconsistent with the boot mode supported by the PCIE device, determine that the PCIE device is a target PCIE device.

The pop-up prompt module is configured to display prompt information that the target PCIE device does not support the target boot mode through a pop-up window.

In some embodiments, the reading module 303 is configured to read the first preset bit of the capability list and the second preset bit in the PCIE capable bits through a capability list pointer of the PCIE device.

In some embodiments, the apparatus further includes an information acquisition module, a linked list generation module, and a structure table generation module.

The information acquisition module is configured to acquire information of all downstream ports through a PCIE protocol.

The linked list generation module is configured to generate a linked list of slot information for each of the PCIE devices based on the information of all the downstream ports.

The structure table generation module is configured to generate a target data structure table based on the linked list of slot information for each of the PCIE devices and the boot mode supported by each of the PCIE devices, so that a user exports the target data structure table and views the boot mode supported by each of the PCIE devices based on the target data structure table.

In some embodiments, the apparatus further includes a sending module.

The sending module is configured to send the file in the preset format to a BMC integrated circuit through a redfish out-of-band interface, so that the BMC integrated circuit displays, based on the file in the preset format, the boot mode supported by each of the PCIE devices under a device list of a BMC network interface.

Figures 4, 5, 6, 7:
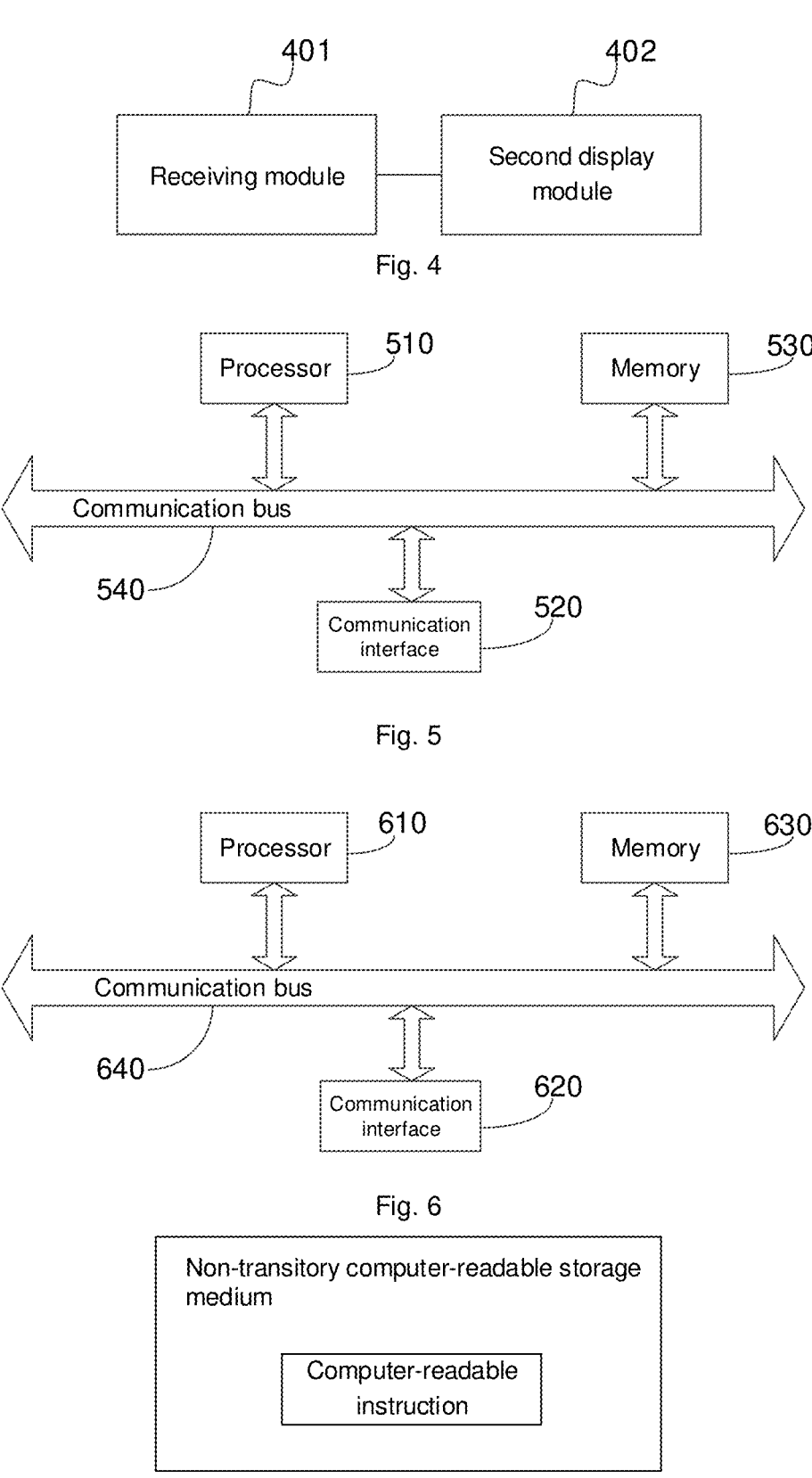
FIG. 4 is a second schematic structural diagram of an apparatus for displaying a boot mode of a PCIE device according to an embodiment of the present disclosure.
FIG. 5 is a schematic structural diagram of a BIOS integrated circuit according to an embodiment of the present disclosure.
FIG. 6 is a schematic structural diagram of a BMC integrated circuit according to an embodiment of the present disclosure.
FIG. 7 is a schematic structural diagram of a non-transitory computer-readable storage medium according to an embodiment of the present disclosure.

Referring to FIG. 4, FIG. 4 is a second schematic structural diagram of an apparatus for displaying a boot mode of a PCIE device according to an embodiment of the present disclosure. As shown in FIG. 4, the apparatus may include a receiving module 401 and a second display module 402.

The receiving module 401 is configured to receive a file in a preset format sent by a BIOS integrated circuit, the file in the preset format is generated based on device informa-tion of each of the PCIE devices, the device information of each of the PCIE devices includes a preset global variable, and the preset global variable stores an AND operation result of a first preset bit of a capability list and a second preset bit in PCIE capable bits in a configuration space of the PCIE device.

The second display module 402 is configured to display, based on the file in the preset format, the boot mode supported by each of the PCIE devices under a device list of a BMC network interface.

In some embodiments, the second display module 402 is configured to:

parse the file in the preset format to obtain the device information of each of the PCIE devices;

for each of the PCIE devices, extract the AND operation result in the preset global variable from the device information of the PCIE device;

determine the boot mode supported by the PCIE device based on the AND operation result; and display the boot mode supported by each of the PCIE devices under the device list of the BMC network interface.

FIG. 5 illustrates a schematic structural diagram of a BIOS integrated circuit. As shown in FIG. 5, the BIOS integrated circuit may include one or more processors 510, a communications interface 520, a memory 530 associated with the one or more processors 510, and a communication bus 540. The processor 510, the communications interface 520, and the memory 530 communicate with each other through the communication bus 540. The processor 510 may call a computer-readable instruction in the memory 530 to perform a method for displaying a boot mode of a PCIE device. The method includes: querying in all root bridge devices in a BIOS initialization device stage after a server is powered on; determining, based on each of the root bridge devices, a PCIE device under the root bridge device; reading a first preset bit of a capability list and a second preset bit in PCIE capable bits in a configuration space of the PCIE device, in response to determining that the PCIE device is present, for each of the PCIE devices; and displaying, based on the first preset bit of the capability list and the second preset bit in the PCIE capable bits, a boot mode supported by the PCIE device under a BIOS device option.

FIG. 6 illustrates a schematic structural diagram of a BMC integrated circuit. As shown in FIG. 6, the BMC integrated circuit may include one or more processors 610, a communications interface 620, a memory 630 associated with the one or more processors 610, and a communication bus 640. The processor 610, the communications interface 620, and the memory 630 communicate with each other through the communication bus 640. The processor 610 may call a computer-readable instruction in the memory 630 to perform a method for displaying a boot mode of a PCIE device. The method includes: receiving a file in a preset format sent by a BIOS integrated circuit, the file in the preset format being generated based on device information of each of the PCIE devices, the device information of the PCIE device including a preset global variable, and the preset global variable storing an AND operation result of a first preset bit of a capability list and a second preset bit in PCIE capable bits in a configuration space of the PCIE device; and displaying, based on the file in the preset format, the boot mode supported by each of the PCIE devices under a device list of a BMC network interface.

In addition, the computer-readable instruction in any one of the above memories may be stored into a computer-readable storage medium, when it is realized in a form of software functional unit and sold or used as an independent product. Based on this understanding, the technical solutions of the present disclosure may essentially, or relative to the parts that contribute to the related art, or part of the technical solutions, be embodied in the form of a software product. The computer software product is stored into a storage medium, and includes a plurality of instructions for enabling a computer device (which may be a personal computer, a server, or a network device, and the like) to execute all or part of the steps of the method described in the various embodiments of the present disclosure. The above storage medium includes: various media capable of storing program codes such as a U disk, a mobile hard disk, a read-only memory (ROM), a RAM, a magnetic disk, or an optical disk.

In another aspect, the present disclosure further provides a computer program product, the computer program product includes computer-readable instructions stored on a computer-readable storage medium, and the computer program includes computer-readable instructions that, when executed by a computer, cause the computer to perform the method for displaying the boot mode of the PCIE device provided by any one of the above methods, which will not be described herein.

In yet another aspect, as shown in FIG. 7, the present disclosure further provides a non-transitory computer-readable storage medium, on which computer-readable instructions are stored. The computer-readable instructions, when executed by one or more processors, implement the method for displaying the boot mode of the PCIE device provided above, which will not be described herein.

The apparatus embodiments described above are merely schematic, in which the units described as separate components may or may not be physically separated. The components displayed as units may or may not be physical units, that is, the components may be located in one place, or may be distributed on the plurality of network units. Part or all of the modules may be selected according to actual needs to achieve the purposes of the solutions of the embodiments. Those of ordinary skill in the art may understand and implement without creative efforts.

Through the above description of implementations, those skilled in the art may clearly know that the implementations of the present disclosure may be implemented by means of software plus a necessary common hardware platform, they may certainly be implemented by means of hardware. Based on such understanding, the above technical solutions may substantially, or relative to the parts that contribute to the related art, be embodied in the form of a software product. The computer software product may be stored into a computer-readable storage medium such as a ROM/RAM, a magnetic disk, and a compact disc, and include a number of instructions for causing a computer device (which may be a personnel computer, a server, or a network device, etc.) to perform the methods of all embodiments or parts of the embodiments.

Finally, it is to be noted that the above embodiments are only intended to describe the technical solutions of the present disclosure, but not intended to limit the present disclosure. Although the present disclosure is described in detail with reference to the foregoing embodiments, it should be understood by those of ordinary skill in the art that: modifications may still be made to the technical solutions described in the foregoing embodiments, or equivalent replacements may be made to parts of the technical features, and these modifications or replacements do not make technical solutions depart from the spirit and scope of the technical solutions of the embodiments of the present disclosure.

The invention claimed is:

1. A method for displaying a boot mode of a peripheral component interconnect express (PCIE) device, applied to a Basic Input Output System (BIOS) integrated circuit, the method comprising:

querying in all root bridge devices in a BIOS initialization device stage after a server is powered on;

determining, based on each root bridge device of the root bridge devices, a PCIE device under the root bridge device;

for the PCIE device, in response to determining that the PCIE device is present, reading a first preset bit of a capability list and a second preset bit in PCIE capable bits in a configuration space of the PCIE device; and displaying, based on the first preset bit of the capability list and the second preset bit in the PCIE capable bits, a boot mode supported by the PCIE device under a BIOS device option.

2. The method according to claim 1, wherein the displaying, based on the first preset bit of the capability list and the second preset bit in the PCIE capable bits, the boot mode supported by the PCIE device under a BIOS device option, comprises:

performing an AND operation on a fourth bit of the capability list and a seventh bit in the PCIE capable bits to obtain an AND operation result;

assigning the AND operation result to a preset global variable;

generating a file in a preset format based on device information of the PCIE device, the device information comprising the preset global variable;

creating, under the BIOS device option, a topology of the PCIE device based on the device information of the PCIE device in the file in the preset format;

creating, under the topology of the PCIE device, a BIOS option of the boot mode supported by the PCIE device;

determining, based on a value of the preset global variable under the BIOS option of the boot mode supported by the PCIE device, the boot mode supported by the PCIE device; and displaying, under the BIOS option of the boot mode supported by the PCIE device, the boot mode supported by the PCIE device.

3. The method according to claim 2, wherein the determining, based on a value of the preset global variable under the BIOS option of the boot mode supported by the PCIE device, the boot mode supported by the PCIE device, comprises:

in response to determining that the value of the preset global variable under the BIOS option of the boot mode supported by the PCIE device is 1, determining that the boot mode supported by the PCIE device is a Unified Extensible Firmware Interface (UEFI) mode and a Legacy mode; or in response to determining that the value of the preset global variable under the BIOS option of the boot mode supported by the PCIE device is 0, determining that the boot mode supported by the PCIE device is a Legacy mode.

4. The method according to claim 1, wherein after a step of the displaying, based on the first preset bit of the capability list and the second preset bit in the PCIE capable bits, a boot mode supported by the PCIE device under a BIOS device option, the method further comprises:

in response to determining that the boot mode of the PCIE device is adjusted to a target boot mode, verifying whether the target boot mode is consistent with the boot mode supported by the PCIE device; and in response to determining that the target boot mode is consistent with the boot mode supported by the PCIE device, storing the target boot mode into a dynamic region of a non-volatile random access memory, so that the PCIE device boots by using the target boot mode at a next boot.

5. The method according to claim 4, wherein after a step of the verifying whether the target boot mode is consistent with the boot mode supported by the PCIE device, the method further comprises:

in response to determining that the target boot mode is inconsistent with the boot mode supported by the PCIE device, determining that the PCIE device is a target PCIE device; and displaying prompt information that the target PCIE device does not support the target boot mode through a pop-up window.

6. The method according to claim 1, wherein the reading a first preset bit of a capability list and a second preset bit in PCIE capable bits in a configuration space of the PCIE device comprises:

reading the first preset bit of the capability list and the second preset bit in the PCIE capable bits through a capability list pointer of the PCIE device.

7. The method according to claim 1, further comprising:

acquiring information of a downstream port through a PCIE protocol;

generating, based on the information of the downstream port, a linked list of slot information for the PCIE device; and generating, based on the linked list of slot information for the PCIE device and the boot mode supported by the PCIE device, a target data structure table, so that a user exports the target data structure table and views the boot mode supported by the PCIE device based on the target data structure table.

8. The method according to claim 2, further comprising:

sending the file in the preset format to a Baseboard Management Controller (BMC) integrated circuit through a redfish out-of-band interface, so that the BMC integrated circuit displays, based on the file in the preset format, the boot mode supported by the PCIE device under a device list of a BMC network interface.

9. The method according to claim 1, wherein the first preset bit is a fourth bit, and the second preset bit is a seventh bit.

10. The method according to claim 1, wherein a value of the first preset bit of the capability list is configured to indicate whether the PCIE device supports a UEFI mode, and a value of the second preset bit in the PCIE capable bits is configured to indicate whether the PCIE device supports the UEFI mode.

11. The method according to claim 1, wherein the determining, based on each root bridge device of the root bridge devices, a PCIE device under the root bridge device comprises:

storing the root bridge device into a linked list; and traversing the root bridge device in the linked list to find the PCIE device under the root bridge device.

12. A BIOS integrated circuit, comprising:

one or more processors; and a memory associated with the one or more processors, the memory being configured to store computer-readable instructions that, when read and executed by the one or more processors, implement steps of the method for displaying a boot mode of a PCIE device according to claim 1.

13. A non-transitory computer-readable storage medium, wherein the non-transitory computer-readable storage medium stores computer-readable instructions that, when executed by one or more processors, implement steps of the method for displaying a boot mode of a PCIE device according to claim 1.

14. A method for displaying a boot mode of a PCIE device, applied to a BMC integrated circuit, the method comprising:

receiving a file in a preset format sent by a BIOS integrated circuit, the file in the preset format being generated based on device information of the PCIE device, the device information of the PCIE device comprising a preset global variable, and the preset global variable storing an AND operation result of a first preset bit of a capability list and a second preset bit in PCIE capable bits in a configuration space of the PCIE device; and displaying, based on the file in the preset format, a boot mode supported by the PCIE device under a device list of a BMC network interface.

15. The method according to claim 14, wherein the displaying, based on the file in the preset format, a boot mode supported by the PCIE device under a device list of a BMC network interface, comprises:

parsing the file in the preset format to obtain the device information of the PCIE device;

extracting, for the PCIE device, the AND operation result in the preset global variable from the device information of the PCIE device;

determining, based on the AND operation result, the boot mode supported by the PCIE device; and displaying the boot mode supported by the PCIE device under the device list of the BMC network interface.

16. The method according to claim 14, wherein the first preset bit is a fourth bit, and the second preset bit is a seventh bit.

17. The method according to claim 14, wherein a value of the first preset bit of the capability list is configured to indicate whether the PCIE device supports a UEFI mode, and a value of the second preset bit in the PCIE capable bits is configured to indicate whether the PCIE device supports the UEFI mode.

18. An apparatus for displaying a boot mode of a PCIE device, comprising:

a query module, configured to query in all root bridge devices in a BIOS initialization device stage after a server is powered on;

a determination module, configured to determine, based on each root bridge device of the root bridge devices, a PCIE device under the root bridge device;

a reading module, configured to, for the PCIE device, in response to determining that the PCIE device is present, read a first preset bit of a capability list and a second preset bit in PCIE capable bits in a configuration space of the PCIE device; and a first display module, configured to display, based on the first preset bit of the capability list and the second preset bit in the PCIE capable bits, a boot mode supported by the PCIE device under a BIOS device option.

19. A BMC integrated circuit, comprising:

one or more processors; and a memory associated with the one or more processors, the memory being configured to store computer-readable instructions that, when read and executed by the one or more processors, implement steps of the method for displaying a boot mode of a PCIE device according to claim 14.

20. A non-transitory computer-readable storage medium, wherein the non-transitory computer-readable storage medium stores computer-readable instructions that, when executed by one or more processors, implement steps of the method for displaying a boot mode of a PCIE device according to claim 14.

* * * * *